United States Patent

[19]

Brand

[11] 4,052,038
[45] Oct. 4, 1977

[54] SCREW EXTRUDER FOR THERMOPLASTICS SYNTHETIC MATERIALS OR ELASTOMERS

[75] Inventor: Wilhelm Brand, Hannover, Germany

[73] Assignee: Hermann Berstorff Maschinenbau GmbH, Hannover-Kleefeld, Germany

[21] Appl. No.: 748,565

[22] Filed: Dec. 8, 1976

[30] Foreign Application Priority Data

Dec. 24, 1975 Germany ............................ 2558638

[51] Int. Cl.² .............................................. B29B 1/06
[52] U.S. Cl. ........................................ 366/90; 366/88
[58] Field of Search ................... 259/191, 192, 193, 9, 259/10, 97, 109, 110; 425/207, 208, 376; 100/146, 145

[56] References Cited

U.S. PATENT DOCUMENTS

| | | | |
|---|---|---|---|
| 3,045,283 | 7/1962 | Keiser | 259/191 |
| 3,788,612 | 1/1974 | Dray | 259/191 |
| 3,957,256 | 5/1976 | Murakami | 259/191 |
| 4,007,922 | 2/1977 | Tamura | 259/191 |

*Primary Examiner*—Robert W. Jenkins
*Attorney, Agent, or Firm*—Donald D. Jeffery

[57] ABSTRACT

A screw extruder for thermoplastics synthetic materials or elastomers having a screw rotating in a cylinder wherein the screw has a mixing part having a plurality of first grooves at an upstream position thereof inclined in the direction of feed, a plurality of second grooves at a position downstream of the first grooves and also inclined in the direction of feed and a grooveless portion between said first grooves and said second grooves, and the cylinder has a mixing part which surrounds said grooveless portion of the mixing part of the screw and has third grooves therein which extend axially or are inclined in the direction of feed, the number of said first grooves, said third grooves and said second grooves differing. Preferably the number of grooves diminishes in the feed direction that is to say the number of said first grooves exceeds the number of said third grooves and the number of said third grooves exceeds the number of said second grooves. The transitions of said third grooves to the cylinder bore are preferably gradual transitions.

3 Claims, 4 Drawing Figures

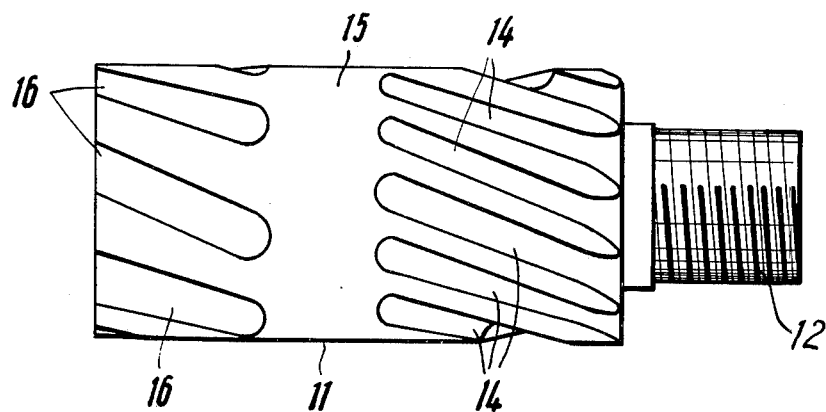
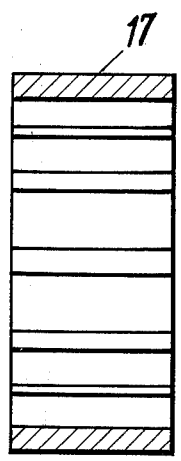
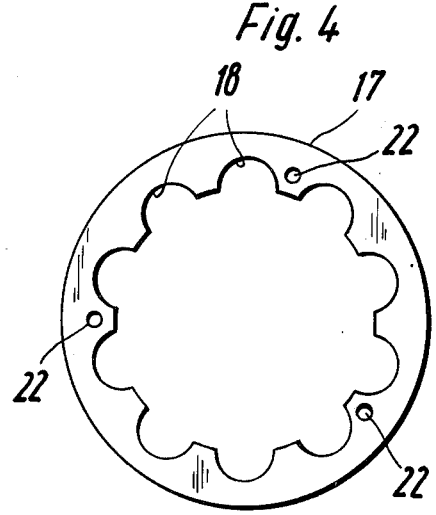

SCREW EXTRUDER FOR THERMOPLASTICS SYNTHETIC MATERIALS OR ELASTOMERS

The invention relates to a screw extruder for thermoplastic synthetic materials or elastomers having a screw rotatable in a cylinder.

Using previously proposed extruders, it is frequently impossible to achieve a sufficiently good mixing action and thus an adequately homogenised extrudate.

The invention is based on the problem of providing a screw extruder having at least one mixer part with which a good mixing action and thus a properly homogenised extrudate can be achieved without overheating the thermoplastics or elastomer material which is to be extruded.

According to the invention, there is provided a screw extruder for thermoplastics synthetic materials or elastomers having a screw rotating in a cylinder wherein the screw has a mixing part having a plurality of first grooves at an upstream position thereof inclined in the direction of feed, a plurality of second grooves at a position downstream of the first grooves and also inclined in the direction of feed and a grooveless portion between said first grooves and second second grooves, and the cylinder has a mixing part which surrounds said grooveless portion of the mixing part of the screw and has third grooves therein which extend axially or are inclined in the direction of feed, the number of said first grooves, said third grooves and said second grooves differing.

The plasticised material fed by a first part of the screw upstream of the mixing part of the screw enters the first grooves of the screw mixer part and is thereby divided into separate strands. At the end of the first grooves, during the period of coincidence of respective first grooves and the third grooves, the material is transferred with a pushing action into the third grooves, forming in each case small strands which emerge from the first grooves as, one after another, they pass by the third grooves. The number of third grooves and first grooves is different. At the end of the third grooves, which bridge the grooveless portion of the screw mixer part the strands of material transferred into the third grooves are passed to the second grooves of the screw mixer part in small strands. The number of the third grooves is again different, and once again there is a subdivision of strands and thus a further mixing action.

The differing number of grooves furthermore guarantees a constant flow of material, since at no time are all the grooves blocked off.

An extruder having such a mixing arrangement according to the invention can produce high-quality extrudate in terms of homogeneity.

Advantageously the number of said first grooves exceeds the number of said third grooves and the number of said third grooves exceeds the number of said second grooves, i.e. the number of grooves reduces in the direction of feed, over the three portions. This additionally achieves a gentler treatment of the material which is constantly opened up to a more satisfactory degree in the direction of feed.

Preferably the transitions of said third grooves to the cylinder bore are gradual transitions so avoiding dead spaces.

The invention is diagrammatically illustrated by way of example in the accompanying drawings, in which:

FIG. 2 shows the screw mixer part of FIG. 1 on an enlarged scale;

FIG. 3 is a cross-section through the cylinder mixing part of FIG. 1; and

FIG. 4 is a side view corresponding to FIG. 3 showing the contours of the cylinder mixing part.

Figure 1:
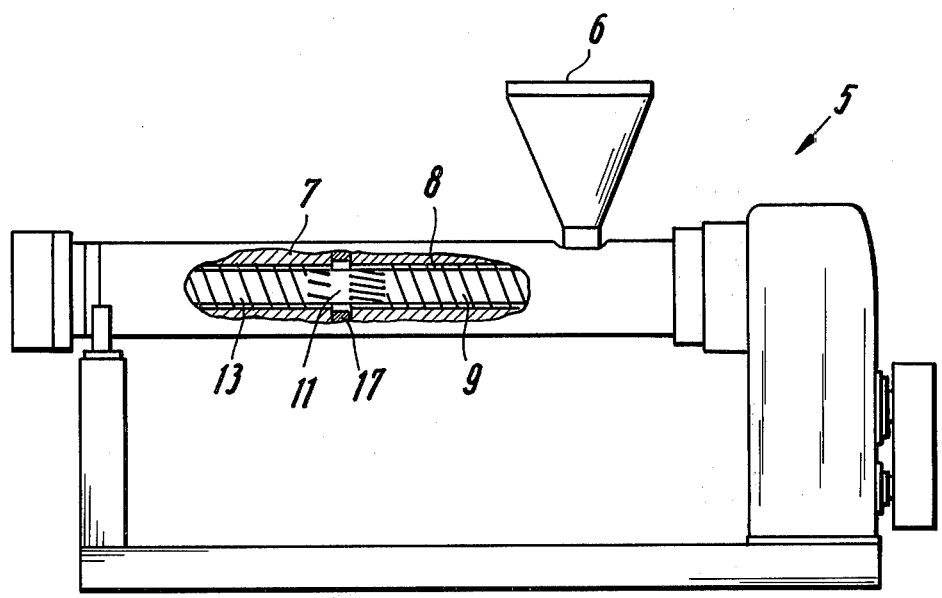
FIG. 1 shows a screw extruder according to the invention, the cylinder being shown partly broken away so that mixing parts on the screw and the cylinder can be seen.

Referring to the drawings, a screw extruder 5 has a material hopper 6 to convey material which is to be plasticised into the interior of the screw extruder 5. A screw 8 is rotatable in a screw cylinder 7 and has a first screw portion 9 which is followed by a screw mixing part 11 which is engaged with the first screw portion 9 by a threaded projection 12. A second screw portion 13 is connected to the downstream end of the screw mixer part 11.

The screw mixer part 11 has a first grooved portion comprising thirteen intake grooves 14 which are inclined in the direction of feed. Adjacent to the intake grooves 14 which end at the outside diameter of the screw mixer part 11 is a plain grooveless portion 15, the diameter of which corresponds to the outside diameter of the screw. The downstream end portion of the screw mixer part 11 has seven delivery grooves 16 which are also inclined in the direction of feed. The delivery grooves 16 have in each case a larger cross-sectional area than the intake grooves 14.

Incorporated in the screw cylinder 7 is a bush 17 which surrounds the plain grooveless portion 15 of the screw mixer part 11. The inside diameter of the bush 17 corresponds to the inside diameter of the screw cylinder 7. This bush 17 has ten axially extending semi-circular grooves 18 in its inner periphery. Reference numerals 22 denote fitting bores to take guide pins.

The material plasticised by the first screw portion 9 is forced into the intake grooves 14 of the screw mixer part 11. Due to the rotary movement of the screw 8, the downstream ends of the intake grooves 14 move past the upstream ends of the grooves 18 in the bush 17, thereby transferring small portions of the plasticised material into the grooves 18. From the grooves 18, the material conveyed is again transferred in small portions to the delivery grooves 16 of the screw mixer part 11. A two-fold positive mixing of materials to be processed is therefore effected.

In order to avoid dead spaces, the transitions of the grooves 18 into the cylinder mixing part 17 are gradual and the grooves 18 may be inclined in the direction of feed or curved.

The number of grooves 14, 18 and 16 in the individual mixing portions can be chosen according to the properties of the materials to be processed. A good mixing action and a good flow behaviour can be obtained due to the differing number of grooves 14, 16 and 18 in the individual portions.

The degree of bridging of the screw mixer part 11 by the cylinder mixer part 17 is likewise chosen to be suitable for the relevant properties of the material to be processed.

What is claimed is:

1. A screw extruder for thermoplastics synthetic materials or elastomers having a screw rotating in a cylinder wherein the screw has a mixing part having a plurality of first grooves at an upstream position thereof inclined in the direction of feed, a plurality of second grooves at a position downstream of the first grooves and also inclined in the direction of feed and a grooveless portion between said first grooves and said second grooves, and the cylinder has a mixing part which surrounds said grooveless portion of the mixing part of the screw and has third grooves therein which extend axially or are inclined in the direction of feed, the number of said first grooves, said third grooves and said second grooves differing.

2. A screw extruder as claimed in claim 1, wherein the number of said first grooves exceeds the number of said third grooves and the number of said third grooves exceeds the number of said second grooves.

3. A screw extruder as claimed in claim 1, wherein the transitions of said third grooves to the cyllinder bore are gradual transitions.

* * * * *